(12) United States Patent
Bandyopadhyay

(10) Patent No.: US 7,150,434 B1
(45) Date of Patent: Dec. 19, 2006

(54) VEHICLE WAKE VORTEX MODIFIER

(75) Inventor: Promode R. Bandyopadhyay, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 135 days.

(21) Appl. No.: 11/070,401

(22) Filed: Feb. 25, 2005

(51) Int. Cl.
*B64C 23/06* (2006.01)

(52) U.S. Cl. ............... 244/130; 114/40; 114/67 R; 244/199.1

(58) Field of Classification Search ........... 244/130, 244/199.1, 199.3, 201, 203, 204.1; 114/40, 114/67 R, 67 A
See application file for complete search history.

(56) References Cited

U.S. PATENT DOCUMENTS

| | | | |
|---|---|---|---|
| 1,682,262 A * | 8/1928 | Antoni .................. | 244/130 |
| RE18,534 E * | 7/1932 | Johnson ................ | 244/130 |
| 4,644,889 A * | 2/1987 | Krans ................... | 114/40 |
| 5,088,433 A | 2/1992 | Osawa et al. | |
| 5,209,438 A * | 5/1993 | Wygnanski ........... | 244/203 |
| 5,222,455 A | 6/1993 | Furey | |
| 5,402,964 A * | 4/1995 | Wygnanski ........... | 244/1 N |
| 5,787,048 A | 7/1998 | Sanford | |
| 5,884,872 A * | 3/1999 | Greenhalgh .......... | 244/201 |
| 5,954,009 A | 9/1999 | Esmiol | |
| 6,571,724 B1 | 6/2003 | Shen | |
| 6,715,717 B1 * | 4/2004 | Dixon et al. .......... | 244/130 |
| 2002/0079405 A1 * | 6/2002 | Layukallo ............. | 244/130 |

OTHER PUBLICATIONS

Promode R. Bandyopadhyay, Maneuvering Hydrodynamics of Fish and Small Underwater Vehicles, Journal, Feb. 2002, pp. 102-117, vol. 42, No. 1, Integrative and Comparative Biology, USA.
Promode R. Bandyopadhyay, Experimental Simulation of Fish-Inspired Unsteady Vortex Dynamics on a Rigid Cylinder, Journal, Jun. 2000, pp. 219-238, vol. 122, Journal of Fluids Engineering, USA.

* cited by examiner

*Primary Examiner*—Galen Barefoot
(74) *Attorney, Agent, or Firm*—James M. Kasische; Michael P. Stanley; Jean-Paul A. Nasser

(57) ABSTRACT

Wake vortices are made less detectable or reduced in their effect on nearby vehicles by re-orientation of vorticity about an axis in the direction of vehicle motion to transverse vorticity interacting with the longitudinal vorticity. The re-orientation may be by a flapping foil, and arrangements of a plurality of foils moving toward or from each other may be used. Alternatively, fluid may be injected longitudinally between opposite surfaces each having a port so that selective suction through the ports alternately attaches the fluid to the surfaces to deflect the fluid from the longitudinal direction and generate transverse vortices. Oppositely rotating vortices may be formed by separators extendable from each surface to engage the deflected fluid, and extension of the separators may be varied to control vortex trajectory. The transverse vortices may be intermittent, selected for speed, or made asymmetric for maneuvering.

9 Claims, 8 Drawing Sheets

VEHICLE WAKE VORTEX MODIFIER

STATEMENT OF GOVERNMENT INTEREST

The invention described herein may be manufactured and used by or for the Government of the United States of America for governmental purposes without the payment of any royalties thereon or therefore.

BACKGROUND OF THE PRESENT INVENTION (1) Field of the Invention

The present invention relates to fluid dynamic forces in ships and in aeronautics. More particularly, the invention relates to vortex generation and dissipation for warship concealment and aircraft sustentation by movably mounted hull adjunct or fluid introducing elements.

(2) Description of the Prior Art

It is known to attempt to modify the wakes of aerial and marine vehicles to make the wakes less detectable or to reduce wake vortices which adversely affect nearby vehicles. Related wake and vortex reduction arrangements are also known for decreasing ship resistance and increasing air foil efficiency.

The following eight United States patents are representative of prior art for these purposes.

U.S. Pat. No. 5,088,433 issued to Osawa, et al. on 18 Feb. 1992 discloses decreasing the wave making resistance of a ship by adjustable fins mounted at the front of the ship and extending above and below the draft line. The fins are thus not applicable to underwater or aerial vehicles and do not directly affect wake vortices.

U.S. Pat. No. 5,158,251 issued to Taylor on 27 Oct. 1992 for "stemming tip vortex generation at its source" by discharging fluid span wise over a fluid foil tip to form a "Coanda curtain" which extends downwardly from the upper side of the foil and prevents vortex generating flow over the tip from its lower side. Tip vortices are thus prevented rather than being dissipated by counter vortices, and the Coanda effect is induced by a continuous flow at from one side of the foil.

U.S. Pat. No. 5,222,455, which issued on 29 Jun. 1993 to Furey, discloses a casing parallel to a ship hull to divert the hull boundary layer fluid to a pump which then expels the fluid alongside of and transversely from the hull. Fluid with the highest concentration of vorticity, which is the source of the most detectable vorticity features of a ship's wake, is thus removed from the wake. The disclosed system thus removes vortices from the wake rather than counteracting and dissipating the vortices.

U.S. Pat. No. 5,787,048 issued 28 Jul. 1998 to Sanford for ship wake signature suppression by projecting ultrasonic acoustic energy, in a range of 0.5 to 2.5 MHz, into the wake for coalescence of microbubbles which make the wake detectable. There is no mention of, or direct effect on, wake vorticity.

U.S. Pat. No. 5,791,875 issued to Ngo on 11 Aug. 1998 discloses the use of the Coanda effect to suppress free-stream air flow around the tip of a "lifting body" to attenuate or remove the tip vortex. Since, in a helicopter blade, high pressure can occur on either surface, an embodiment shown on FIG. 4 can direct the Coanda flow in either direction. However, in any one time the Coanda effect inducing flow is continuous and tip vortices are not subsequently dissipated by counter vortices.

U.S. Pat. No. 5,954,009 issued to Esmiol on Sep. 21, 1999 for a ship and submarine wake attenuation system having plates parallel to and outboard of a hull to reflect the wake back and forth between the plates and the hull to attenuate the wake. There is no mention of, or direct effect on, wake vorticity.

U.S. Pat. No. 6,082,679 issued to Crouch, et al. on 4 Jul. 4, 2000 for, as stated in column 1, a method and apparatus "addressing aircraft trailing vortices". The only disclosed embodiment, which is in accordance with claim 4, moves a pair of existing control surfaces that are spaced span wise on an aircraft wing—aileron and flaperon, or aileron and spoiler—so as to excite instabilities of the vortices. As stated in column 7, the control surface motions are "preferably a waveform" with an aileron having positions "above the wing upper surface and below the wing lower surface" while a spoiler "can only move to positions above the wing upper surface."

In Crouch, the generation of counter vortices is not mentioned. And, the use of a single moveable surface or multiple surfaces flapping toward or and from each other is not disclosed. While Crouch states in column 4 that one embodiment may be "a submarine with lifting surfaces that produce at least two vortex pairs." no such embodiment is disclosed.

U.S. Pat. No. 6,513,761 issued on 4 Feb. 2003 to Huenecke discloses the use of a vortex generating flap to reduce a trailing vortex from an aircraft wing by generating a corresponding counteracting vortex imposed on the trailing vortex. As stated in Column 5 with reference to FIG. 6 where it is seen that the trailing vortices are about longitudinal axes, counter vortices 13 and 14 "are injected into the respective flap vortices 12B and 11B to thereby cause these flap vortices 11B and 12B to vibrate as indicated by the zigzag lines 11C and 12C, whereby the intensity of the respective flap vortices 11B and 12B is rapidly diminished or dissipated." Also, as stated in Column 8, vortex generating flaps 9 and 10 may be in a "stationary extended position . . . or they can be operated dynamically by repeatedly extending . . . into the airstream . . . Moreover, the flaps on the [opposite wings] . . . may be . . . extended and retracted simultaneously . . . , or . . . one extended while the other is retracted . . . In both instances . . . longitudinal vibrations or asymmetric counter vortices are generated . . . suitable for accelerating the dissipating of the trailing vortices."

In Huenecke, as shown in FIG. 6, the counteracting vortices 13 and 14 are axially parallel to the flap vortices 12B and 11B which are to be dissipated and the use of surfaces flapping toward and from each other is not mentioned.

The paper:

Bandyopadhyay, P. R., Castano, J. M., Nedderman, W. H. & Donnelly, M. J.; "Experimental Simulation of Fish-Inspired Unsteady Vortex Dynamics on a Rigid Cylinder,"; ASME Journal of Fluids Engineering, Vol. 122, No. 2, pp. 219–238, of which the present inventor is a co-author, describes generation of propulsive vortices by flapping foils, these vortices being about axes generally transverse to the longitudinal direction of propulsion. However, there is no mention of these vortices in connection with longitudinal vortices or their modification.

SUMMARY OF THE INVENTION

The present invention is concerned with an device and methods for modification of vehicle wake vortices to make surface ships, submarines, and torpedoes less detectable by reducing their wakes and varying the signature thereof and to reduce the wakes of marine and aerial vehicles so that nearby vehicles, as in harbors or airports, are not adversely affected by the wakes.

The present invention provides such wake modification by re-orientation of wake vorticity, from about a longitudinal axis in the direction of vehicle motion, to transverse vorticity which interacts with the longitudinal vorticity.

The present invention provides such wake modification by re-orientation of wake vorticity—which is typically about a longitudinal axis in the direction of vehicle motion due to a propeller, to shedding by vehicle structure as in the above mentioned FIG. 6 of U.S. Pat. No. 6,513,761, or to a necklace vortex starting from a submarine sail juncture where the incoming boundary layer vorticity is wrapped around the sail—to transverse vorticity which interacts with the longitudinal vorticity.

The invention resulted from biomimetics research using flapping foils as described in the above paper, "Experimental Simulation of Fish-Inspired Unsteady Vortex Dynamics on a Rigid Cylinder". Measurements of the vorticity distribution, phase averaged to the flapping foil motion, were carried out using advanced multi-plane laser Doppler anemometry and showed that, within a surprisingly downstream distance, the wake dies down by a factor of 3 due to re-orientation of vorticity.

For the purposes of the present invention, this re-orientation may be carried out in any suitable manner which, in a vehicle wake, produces vortex trains that react with and neutralize the wake. Two arrangements for this re-orientation are a flapping foil or foils and a Coanda effect fluidic amplifier. These arrangements are typically disposed at a vehicle tail or trailing portion where the portion may be the stern of a ship, a submarine sail, a hydrofoil that can be placed behind a torpedo or submarine propulsor, or an airfoil.

When a flapping foil is used, the foil moves generally about an axis transversely related to the direction of vehicle movement as does an aileron or rudder, but the foil is oscillated so as to generate vortices about axes transversely related to this direction. A single foil may be used or a plurality of foils variously moving toward or from each other may be used. The foil movements, and phases of multiple foils, may variously be intermittent, be altered in frequency and amplitude, or be asymmetric. These variations are advantageously selected for conditions when wake detection or reduction is not important, when vehicle speed changes, or when a vehicle maneuvers.

When a Coanda effect fluidic amplifier is used for the purposes of the present invention, a vehicle portion, such as an above-identified trailing portion, is provided with a slot or cavity having transversely opposite surfaces extending in the longitudinal direction to a narrow opening in the trailing region of the vehicle portion. From each of the opposite surfaces, an arcuate surface extends outwardly, at first rearwardly and then forwardly of the opening to the exterior of the tail portion. Each of the recurved surfaces is provided, at its inward portion, with a fluidic amplifier suction port.

The tail portion is associated with any suitable device, such as a pump, providing a flow of ambient fluid through the slot toward the opening. This will produce thrust, and the source of the fluid may be a region of the vessel where suction would advantageously produce an attached flow.

The suction ports are each connected to a fluidic device for selectively drawing or sucking fluid through each port. When this occurs at one port the, fluid flow through the slot attaches, by the Coanda effect, to the corresponding arcuate surface so that the fluid flow is deflected in the direction of the activated suction port. It is apparent that, when suction is applied alternately to the ports, the fluid flow is oscillated transversely of the tail portion so as to create transverse vortices for the purposes of the present invention.

Preferably, each of the arcuate surfaces is provided with a vane-like salient edge obstruction extending rearwardly in the longitudinal direction from the rearwardmost part of the surface. This obstruction may be rectangular in cross-section, or may terminate in a sharp edge disposed at the obstruction side toward the slot. Also, the obstruction may be provided with any suitable actuator to selectively locate or reciprocate the obstruction in the longitudinal direction from within the arcuate surface to a position fully extended therefrom.

With one of the obstructions extended from the arcuate surface and fluid flow deflected toward the obstruction by suction through the corresponding suction port, flow of the fluid over the obstruction, as at the sharp edge, leads to the formation of a vortex which leaves the arcuate surface while rotating in a direction where the side of the vortex toward the slot moves away from the arcuate surface. As a result, when suction is applied alternately to the ports as before mentioned, vortices rotating oppositely about a transverse axis are shed alternately from the obstructions into the fluid flow.

The obstructions may be selectively oscillated or otherwise positioned in and out of the arcuate surfaces to control the trajectory and phasing of the shed vortices.

As with the above-described flapping foil or foils, vortices selected for different conditions maybe generated by suitably timed applications of suction to the suction ports and coordinated movements of the salient edge obstructions. The periods during which suction is applied may be different in phasing and period for the opposite deflections of the fluid flow so as to create an asymmetric wake shedding of vortices as during maneuvering.

Devices embodying the principles of the present invention, whether using a flapping foil or the fluid amplifier, may be disposed at any suitable location on a vehicle. With surface vessels this is typically on the stern above a propulsor with one device being used with a sharp stern and a pair of devices being spaced transversely of the hull with a square stern. Such a device may also be conveniently overhung from the stern. With a torpedo or submarine shapes tapering to a propulsor, such devices may be overhung from the vehicle or mounted on the propulsor assembly. An array of such devices may be spaced transversely of a vessel.

It is therefore an object of the present invention to make marine vehicle wakes less detectable.

Another object of the present invention is to minimize marine and aerial vehicles wake vortices that may affect other vehicles.

A further object of the present invention is to modify the detectable signature of marine vehicle wakes in ways that may be selected for particular speeds and maneuvers.

Yet another object of the present invention is to modify vehicle wakes for the above purposes without significant adverse effects on vehicle speed or maneuverability.

Further objects are to provide, for the above purposes, a device which is simple in construction, retrofittable, and unobtrusive.

BRIEF DESCRIPTION OF THE DRAWINGS

These and other objects, advantages, and novel features of the present invention will be apparent from the following detailed description when considered with the accompanying drawings wherein.

DETAILED DESCRIPTION OF THE INVENTION

Figure 1:
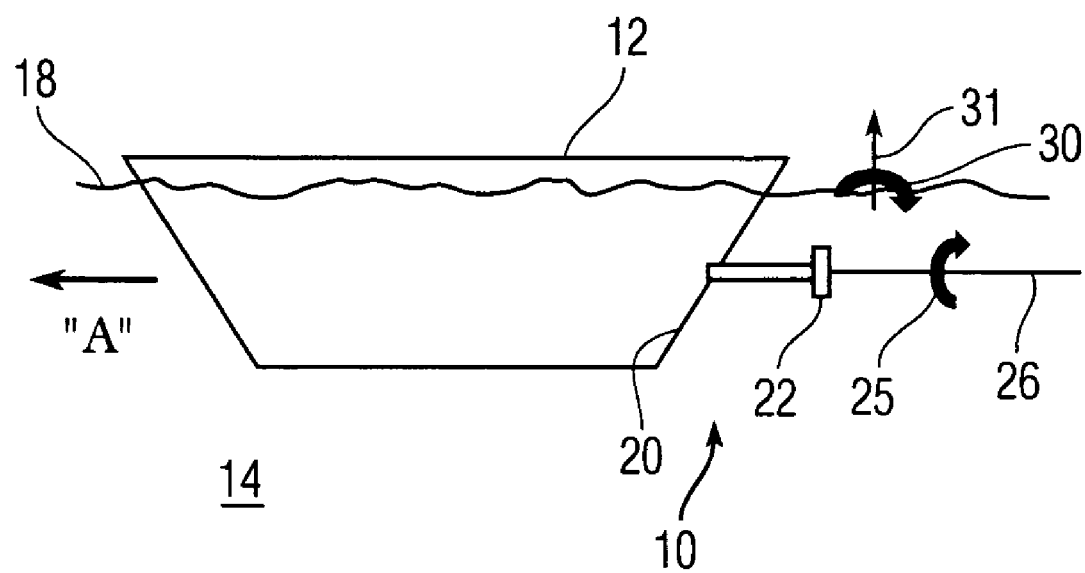
FIG. 1 is a schematic diagram of a surface ship provided with a device for modification of vehicle wake vortices in accordance with the present invention, the diagram showing original longitudinal wake vorticity and transverse vorticity generated by the device.

Referring more particularly to the drawings, in FIG. 1 a device for modification of vehicle wake vortices in accordance with the present invention is indicated by numeral 10 in a representative operating environment in which the device is mounted on a vehicle 12 moving through a fluid 14 in a forward or longitudinal direction "A". The vehicle 12 is represented as a surface ship having a waterline 18 and having the device mounted below the waterline on a stern or trailing portion 20 of the ship. The vehicle 12 has a representative propulsor 22, such as a propeller rotating about a longitudinal axis.

While the longitudinal direction "A" is represented as being generally horizontal or parallel to a waterline 18, it will be apparent that the principles of the present invention may be applied to other vehicles, such as underwater or aerial vehicles, whose direction of movement, particularly during maneuvers, may be otherwise oriented.

It will also be apparent that a device, which corresponds to the device 10 in having structure embodying the principles of the present invention and in being adapted to perform a method in accordance therewith, may be disposed at other vehicle trailing portions including portions of vehicles completely immersed in fluids through which the vehicle moves. Representative such vehicle portions include a submarine sail, a hydrofoil disposed behind a torpedo or submarine propulsor, or an airfoil.

Movement of the vehicle 12 in the longitudinal direction "A" results in wake vorticity, indicated by numeral 25, about a longitudinal axis 26.

The source of this vorticity is not involved in the present invention, which is concerned with minimization or suppression of disadvantageous effects of such longitudinal vorticity. However such vorticity typically arises by the rotation of a propulsor or by shedding from a vehicle structure. The longitudinal vorticity is present in the wake of the vehicle 12 where this vorticity, which may extend for a great distance behind and to the sides of the vehicle, may result in the detection of a military vehicle or have hazardous effects on the control of nearby aerial or marine vehicles.

The present invention provides modification of such longitudinal wake vorticity 25 by its re-orientation into transverse, counter vorticity, which is indicated in FIG. 1 by numeral 30 and is about a transverse axis 31 that is generally orthogonal to the longitudinal axis 26. In FIG. 1, the axis of vorticity 30 is represented as being about an axis which generally vertical or generally normal to waterline 18, however the present invention may utilize otherwise oriented counter vorticity generated in any suitable manner and substantially transversely related to vorticity, which corresponds to wake vorticity 25, to modify the original wake vorticity, as by vortex trains that react with and minimize or neutralize the wake.

The present invention is thus effective to modify vehicle wakes so that surface ships, submarines, and torpedoes are less detectable by reducing their wakes and varying the signature thereof and so that the wakes of marine and aerial vehicles are reduced so that nearby vehicles, as in harbors or airports, are not adversely affected by the wakes.

Devices suitable for re-orienting wake vortices in accordance with the present invention include flapping foil structures and structures using a Coanda effect fluidic amplifier.

Figure 2:
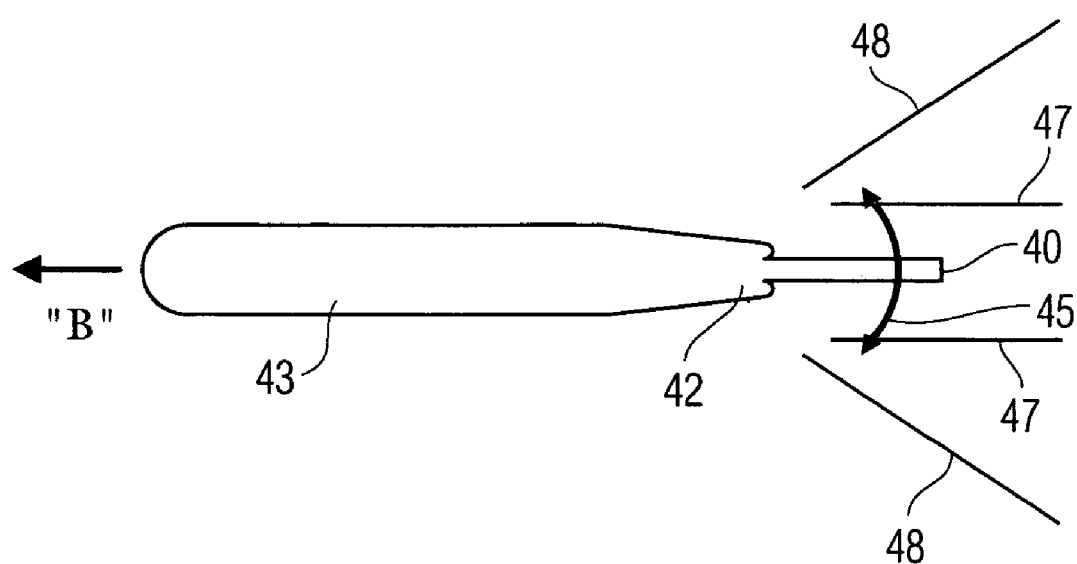
FIG. 2 is a diagram of a vehicle or portion thereof provided with such a device having a flapping foil.

FIG. 2 shows one embodiment of such a flapping foil structure having a single such foil 40 mounted on the trailing portion 42 of a structure 43 which may be a torpedo-like vehicle, hydrofoil, or airfoil although, as before stated, the present invention is not so limited. The structure 43 is represented as moving in a longitudinal direction "B", and the foil is adapted, in any suitable manner, for powered and controlled flapping or oscillating movement about an axis transversely related to the direction of vehicle movement. This movement is indicated by curved arrow 45 and results in the unperturbed wake indicated by numerals 47 being dispersed as indicated by numerals 48 due to transverse vortices, not shown, shed by the foil in its movement 45.

Figure 3:
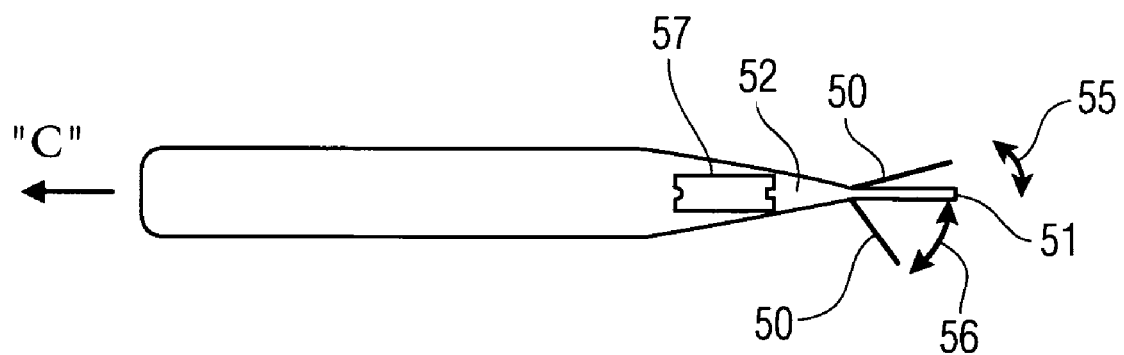
FIG. 3 is a diagram similar to FIG. 2 where the device has a pair of flapping foils.

FIG. 3 shows another embodiment of such a flapping foil structure having a pair of foils 50 mounted, together with a fixed divider 51 between them, on a trailing vehicle portion 52 which corresponds to vehicle portion 42 of FIG. 2 and moves in a longitudinal direction "C". The foils are actuated to move as indicated by curved arrows 55 and 56 by any suitable actuator represented by block 57 so as shed transverse vortices, not shown, to modify a wake, also not shown, associated with the vehicle portion 52. It will be noted that the foils are not equally spaced from the divider 51 and that the arrows 55 and 56 are of unequal lengths to represent selective variations of the individual foil movements in amplitude and relative phase as may be used during vehicle maneuvers.

With the FIG. 2 as well as the FIG. 3 embodiment, it is evident that the counter vortices of the present invention may be directed in one direction transversely of the longitudinal movement "B" by oscillating the foil 40 or of the longitudinal movement "C" by oscillating the foil 50 asymmetrically.

Figure 4:
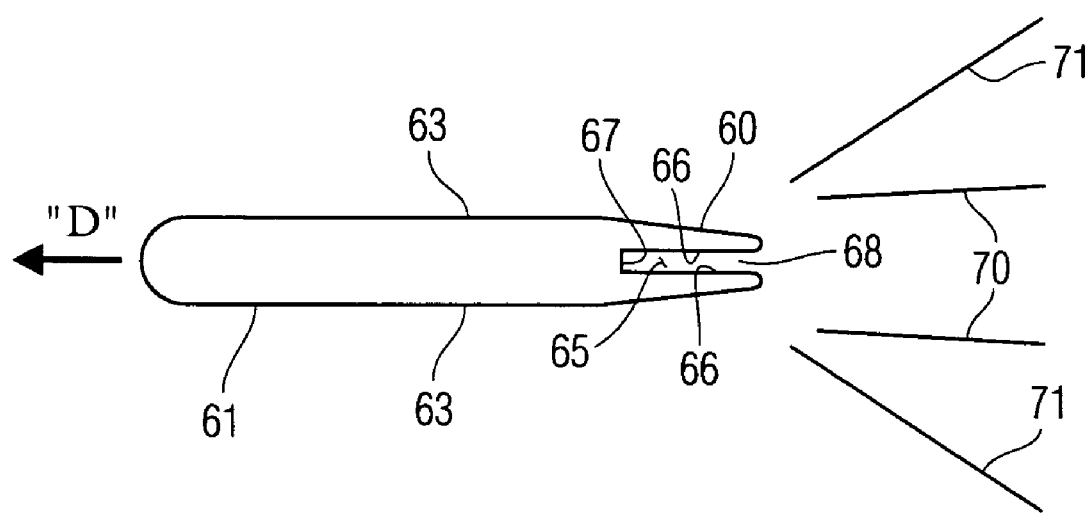
FIG. 4 is a diagram of a vehicle or portion thereof configured for use of such a device using a fluidic amplifier.

FIG. 4 shows a trailing vehicle portion 60 adapted for an embodiment of the present invention using a Coanda effect fluidic amplifier. The portion 60 is part of a structure 61 corresponding to the structure 43 of FIG. 2 and, similarly, moving in a longitudinal direction "D". The structure 61 has transversely opposite exterior surfaces 63 extending oppositely of the vehicle portion 60. The vehicle portion 60 is so adapted by having, transversely centrally, a longitudinally extending cavity or slot 65 defined by transversely opposite bounding surfaces 66 extending in the longitudinal direction from a closed end 67 of the slot to a narrow opening 68 in the most trailing region of the structure 61.

The embodiment using a Coanda effect fluidic amplifier is like that of FIG. 2 in dispersing an unperturbed trailing wake indicated by numerals 70, the dispersion being indicated by numerals 71 and being due to transverse vortices, not shown, generated by the Coanda effect fluidic amplifier whose structure and operation will now be described in connection with FIGS. 5 and 6.

Figure 5:
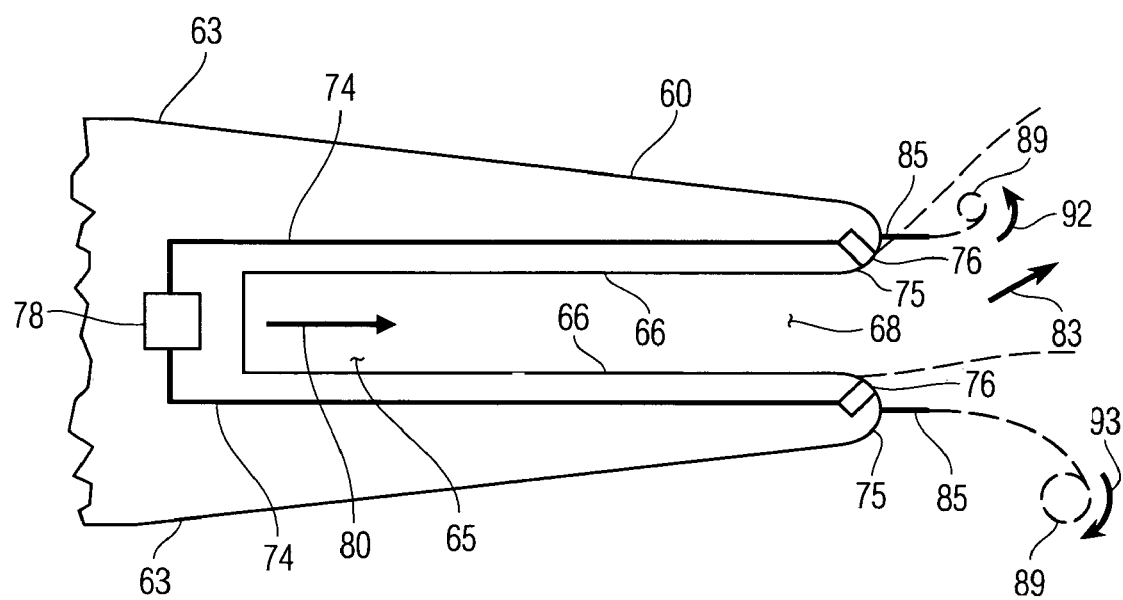
FIG. 5 is a diagram, at a larger scale than FIG. 4, of a fragmentarily represented such fluidic amplifier device together with vortices generated by the device.

In FIG. 5, it is seen that the fluidic amplifier structure includes, at each transverse side, an arcuate surface 75 which is convex in the trailing direction and recurved so as to join and be continuous with the surfaces 63 and 66. Each surface 75 is provided at its inward region with a fluidic amplifier suction port 76. The fluidic amplifier structure also includes any suitable device, indicated by block 78, and connected by individual conduits 79 to ports 76 for selectively drawing fluid through each of the ports.

The fluidic amplifier structure is associated with any suitable device such as a pump, not shown, providing a flow of ambient fluid through slot 65 toward opening 68 as indicated by arrow 80. Although not necessary for the present invention, this flow will produce thrust and the source of the fluid may be a vehicle region where suction would advantageously produce an attached flow.

When suction is applied to one of the ports 76 as indicated by arrow 82, flow 80 attaches, by the Coanda effect, to the corresponding arcuate surface 75 so that the flow 80 is deflected in the direction of the activated suction port as indicated by arrow 83. This deflection may result in transverse counter vortices for the purposes of the present invention, and phased, alternate application of suction to the ports 76 will provide and remove the Coanda effect at each surface 75 to oscillate the fluid flow for this purpose. If the Coanda effect is provided and removed alternately at each surface 75 in asymmetric time phased relation the counter vortices may be directed transversely of the longitudinal movement "D".

Figure 6:
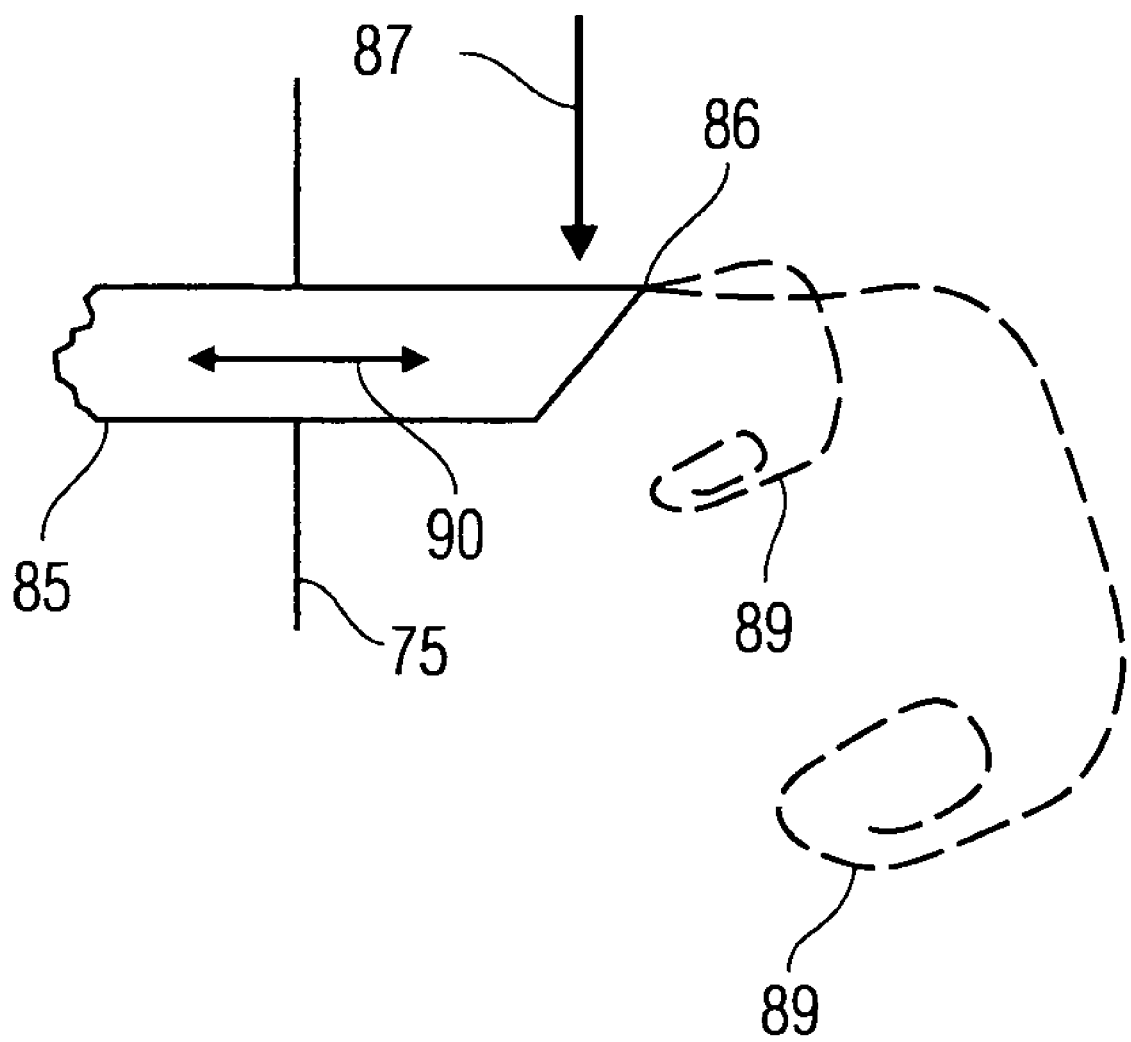
FIG. 6 is a diagram, at a larger scale, of a fragmentarily represented salient edge obstruction of the device of FIG. 5.

Preferably and to promote the formation of transverse vortices for the purposes of the present invention, each of the arcuate surfaces 75 is provided with a vane-like, salient edge obstruction 85 shown in FIG. 5 and in greater detail in FIG. 6. Each obstruction extends in the longitudinal direction from the trailingmost part of the corresponding surface 75. The obstruction may be rectangular in cross-section, or, preferably and as seen in FIG. 6, may terminate in a sharp edge 86 disposed at the obstruction side toward the slot 65. As a result deflected fluid from the slot, indicated in FIG. 6 by arrow 87, is shed from the obstruction as transverse vortices 89.

Each obstruction 85 may be provided with any suitable actuator, not shown, to selectively locate or reciprocate the obstruction in the longitudinal direction, as indicated by arrow 90, from within the arcuate surface to a position fully extended therefrom.

It is apparent from FIG. 5, that with one of the obstructions 85 extended from the corresponding arcuate surface 75 and fluid flow deflected toward the obstruction by suction through the corresponding suction port 76, flow of the fluid over the obstruction, as at the edge 86, leads to the formation of a vortex which leaves the arcuate surface while rotating in a direction, indicated by arrows 92 and 93, where the side of the vortex toward the slot moves away from the arcuate surface. As a result, when suction is applied alternately to the ports, vortices rotating oppositely about a transverse axis, as indicated by arrows 92 and 93 are shed alternately from the obstructions into the fluid flow 80.

It is apparent that the salient edge obstructions 85 may be selectively oscillated or otherwise positioned in and out of the arcuate surfaces 75 to control the trajectory and phasing of the shed vortices. As a result and as with the above-described flapping foil or foils 40 and 50, vortices selected for different conditions maybe generated by suitably timed applications of suction to suction ports 76 and coordinated movements of the obstructions. The periods during which suction is applied may be different in phasing and period for the opposite deflections of the fluid flow so as to create an asymmetric wake shedding of vortices as during maneuvering.

Since the rate of fluid flow 80, suction at ports 76, and extension of obstructions 85 may be selectively controlled, the transverse vortices indicated by arrows 92 and 93 may be omitted if unneeded, used intermittently for deception, selected for vehicle speed, or made asymmetric for vehicle maneuvering.

Figure 7:
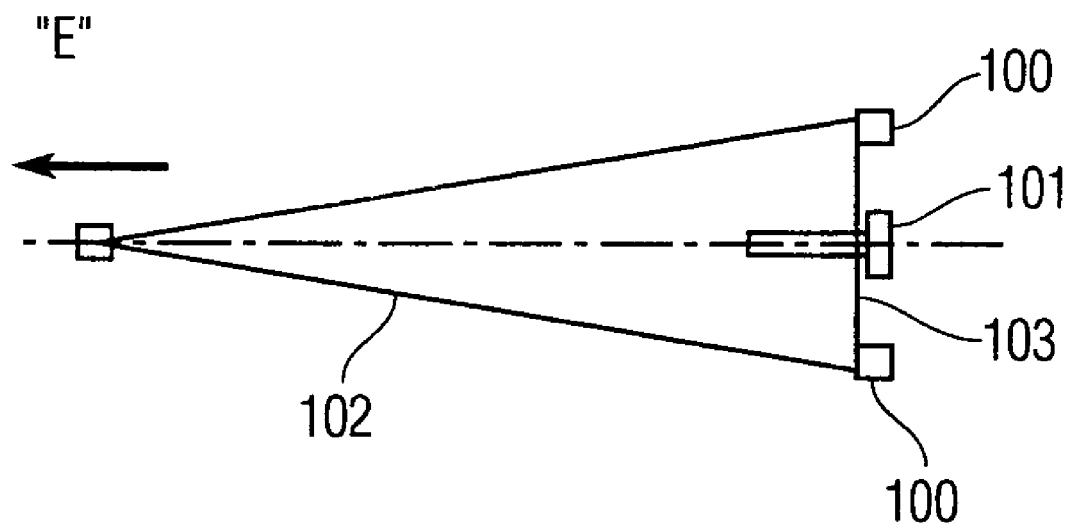
FIG. 7 is a schematic diagram of a vehicle provided with one arrangement of devices embodying the present invention.

Devices embodying the principles of the present invention, whether using a flapping foil as in FIGS. 2 and 3 or a fluid amplifier as in FIGS. 5 and 6, may be disposed at any suitable locations on a vehicle. With surface vessels this may be as shown in FIG. 1 with device 10 on the stern 20 above a propulsor 22. One device may be used with a sharp stern, and as shown in FIG. 7, a pair of devices 100 may be spaced transversely of a propulsor 101 on a hull 102 having a square stern 103 and proceeding in a longitudinal direction "E". Such devices may also be conveniently overhung from the stern as in a hydrofoil. It will be apparent that, with torpedo or submarine shapes, not shown and tapering to a propulsor, such devices may be overhung from the vehicle or mounted on the propulsor assembly. An array of such devices may be spaced transversely of a vessel.

Figure 8:
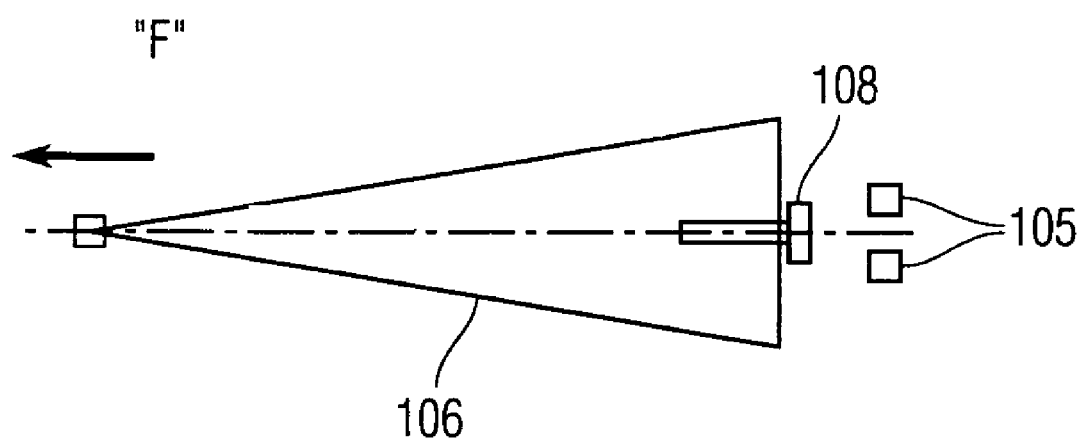
FIG. 8 is a diagram similar to FIG. 7 showing another arrangement of devices embodying the present invention.

As shown in FIG. 8, devices 105 embodying the principles of the present invention may be mounted in any suitable manner on a vehicle 106, which is moving in a longitudinal direction "F", immediately aft of a propulsor 108 so that the device is particularly effective in modifying longitudinal vortices generated by the propulsor.

With marine vehicles, devices embodying the principles of the present invention are conveniently and effectively disposed so that the generated vortices have generally vertical axes. With aircraft, such devices may be disposed along the wing trailing edge and generate transverse vortices about axes parallel to the wing or a transverse array of the devices positioned as in a marine vehicle.

It is apparent that both the flapping foil embodiments of the present invention and the Coanda effect fluidic amplifier embodiments are amenable to digital control in that they can be turned on or off and programmed for varying speeds and maneuvers or asymmetric wake control, the vortex trajectory being selectively controlled in maneuvering and vortex oscillations being selected in frequency and amplitude to augment wake dispersion by resonance. It is also apparent that these embodiments may alter the noise signature of a wake and, in contrast to prior art for this purpose, may be configured to provide thrust or, at least, minimally increase drag. It is further apparent that these embodiments, which may be placed aft of a propeller or other propulsor for greatest effect, are applicable in unobtrusive configurations to all platforms—surface vessels, submarines, torpedoes, and aircraft—and, typically, can be retrofitted thereto.

Although the present invention has been herein shown and described in connection with what is conceived as the preferred embodiment, it is recognized that departures may be made therefrom within the scope of the invention, which is not limited to the illustrative details disclosed.

What is claimed is:

1. A device for minimizing a wake of a vehicle moving in a fluid, said device comprising:
   a first foil with a first end attachable to a trailing end of the vehicle in which said first foil oscillates by the energy from the wake from said first end in a direction transverse to an axis of the wake such that a vorticity of the wake re-orientates into a counter vorticity transverse to the vorticity of the wake thereby minimizing the wake of the vehicle; and
   a divider mountable to the trailing end of the vehicle and extending at a mounting end along an axis coincident to a longitudinal axis of the vehicle wherein said first end of said first foil attaches an end of said divider opposite said mounting end of said divider.

2. The device in accordance with claim 1 wherein said first foil is attached on a longitudinal side of said divider with said device further comprising a second foil with an end attached on an opposite side of said divider;
   wherein said second foil oscillates from said end of said second foil in a direction transverse to an axis of the wake such that a vorticity of the wake re-orientates into a counter vorticity transverse to the vorticity of the wake thereby minimizing the wake of the vehicle.

3. A device for minimizing a wake of a vehicle moving in a fluid, said device comprising:
   a structure as a trailing portion attachable to extend at a first end from the vehicle, said trailing portion defined by a longitudinally extending slot bordered by transversely opposite bounding surfaces;
   a Coanda effect fluidic amplifier encompassed by said trailing portion in which at each transverse side of said amplifier includes an arcuate surface continuous with said bounding surfaces and in which said amplifier includes a pump;
   a suction port positioned at each arcuate surface, said suction port fluidly connected to said pump;
   wherein suction applied to one of said suction ports and onto said fluid amplifier attaches as flow by a Coanda effect to said corresponding arcuate surface so that the flow is deflected in the direction of said applied suction port resulting counter vortices transverse to the deflected direction.

4. The device in accordance with claim 3, said device further comprising a controller fluidly connected to each of said suction ports wherein said controller selectively draws fluid through each of said suction ports.

5. The device in accordance with claim 4, wherein said Coanda effect fluidic amplifier is capable of providing a flow of fluid to a second end of said trailing portion opposite said first end of said trailing portion as a source of thrust for the vehicle.

6. The device in accordance with claim 5, said device further comprising a vane-like obstruction extending from said second end of said trailing portion parallel with said longitudinal structure, said obstruction including a salient edge narrowing away from said slot, said salient edge capable of deflecting the fluid from said slot as transverse vortices.

7. The device in accordance with claim 6, said device further comprising an actuator capable of selectively locating or reciprocating said obstruction in the longitudinal direction from said arcuate surface to a position fully extended therefrom to control the trajectory and phasing of the transverse vortices.

8. The device in accordance with claim 7, wherein said device is capable of producing vortices selected for different conditions generated by suitably timed applications of suction to said suction ports and coordinated reciprocation of said obstructions.

9. The device in accordance with claim 8, said device further including a propulsor wherein said vane-like obstruction extends immediately aft of said propulsor 108 so that longitudinal vortices generated by the propulsor are transversely modified.

* * * * *